(No Model.) 2 Sheets—Sheet 1.
J. A. BOWDEN.
FILTERING APPARATUS.
No. 455,527. Patented July 7, 1891.
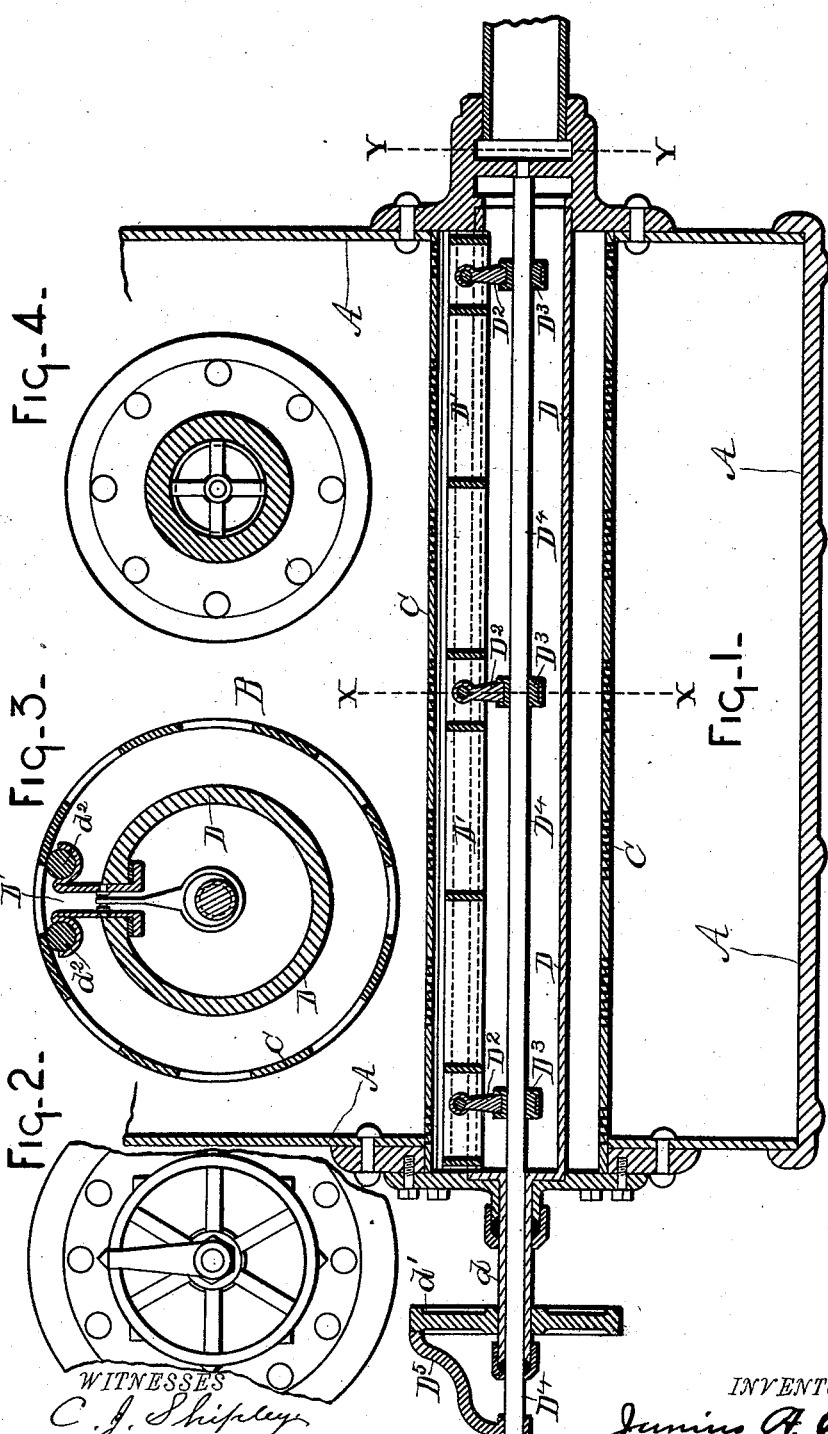
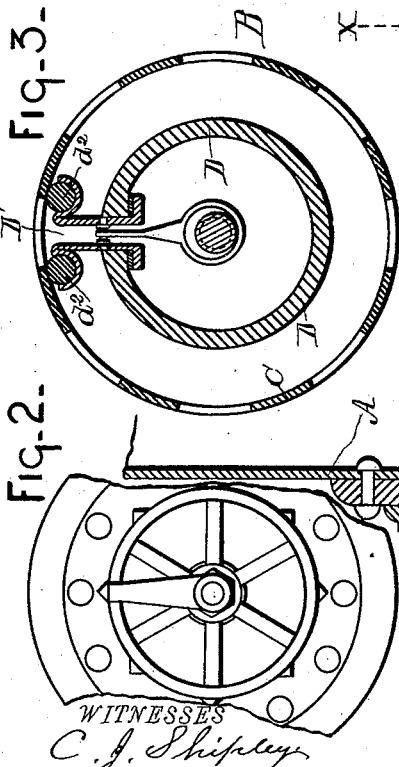
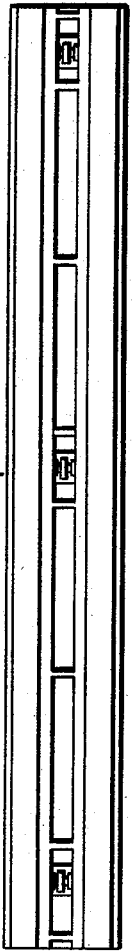
WITNESSES
C. J. Shipley
W. G. Hodge
INVENTOR
Junius A. Bowden
By Wells N. Leggett & Co.
Attorneys.

(No Model.) 2 Sheets—Sheet 2.
J. A. BOWDEN.
FILTERING APPARATUS.
No. 455,527. Patented July 7, 1891.
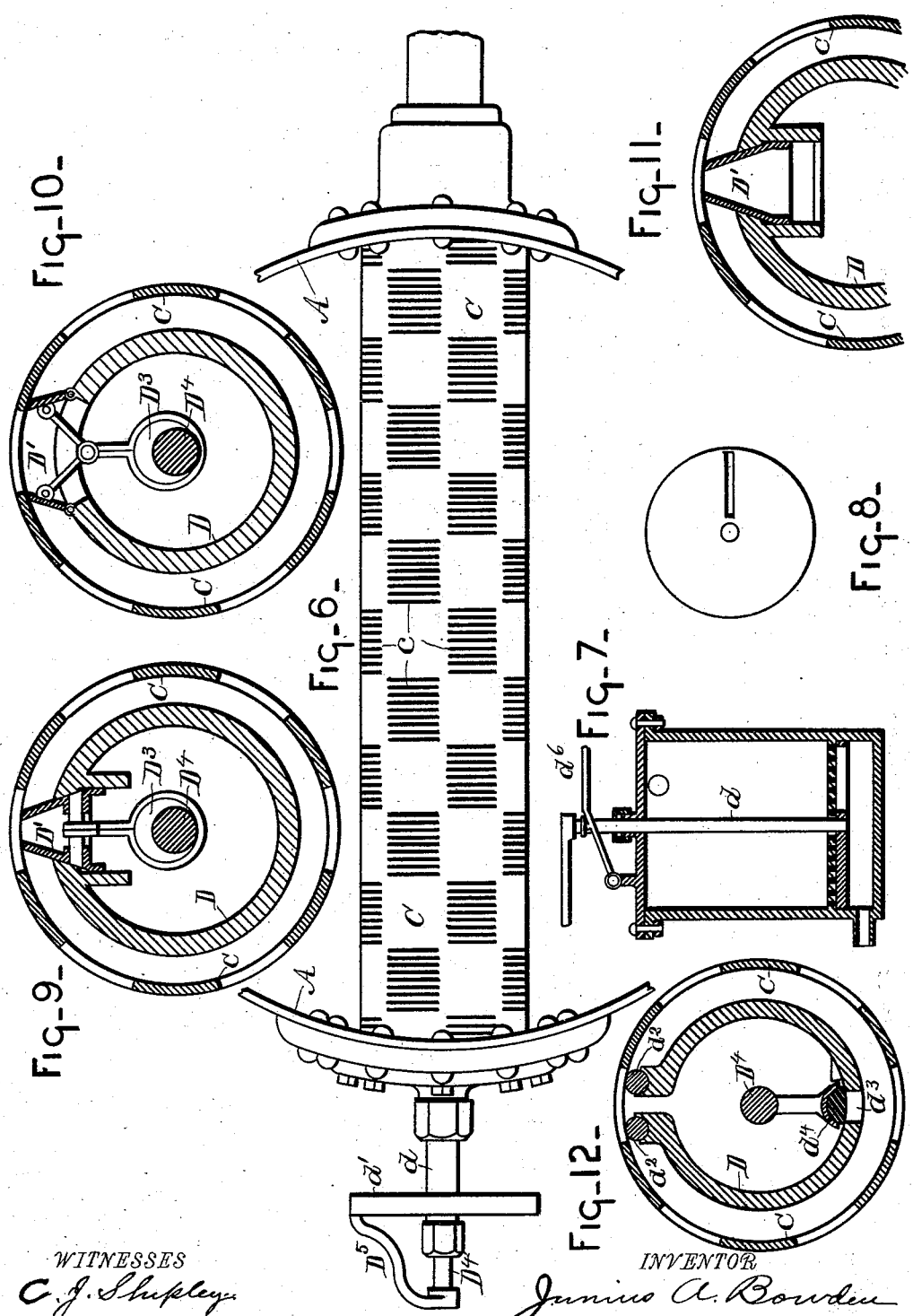
WITNESSES
C. J. Shipley
W. G. Hodge
INVENTOR
Junius A. Bowden
By Wells W. Leggett & Co
Attorneys.

UNITED STATES PATENT OFFICE.

JUNIUS A. BOWDEN, OF DETROIT, MICHIGAN.

FILTERING APPARATUS.

SPECIFICATION forming part of Letters Patent No. 455,527, dated July 7, 1891.

Application filed November 22, 1890. Serial No. 372,356. (No model.)

*To all whom it may concern:*

Be it known that I, JUNIUS A. BOWDEN, a citizen of the United States, residing at Detroit, county of Wayne, State of Michigan, have invented a certain new and useful Improvement in Filtering Apparatus; and I declare the following to be a full, clear, and exact description of the same, such as will enable others skilled in the art to which it pertains to make and use the same, reference being had to the accompanying drawings, which form a part of this specification.

In the drawings, Figure 1 is a sectional view by a vertical plane of the base of a filter, illustrating my invention. Fig. 2 is an end view of my valve-operating mechanism. Fig. 3 is a cross-section on the line $xx$ of Fig. 1. Fig. 4 is a cross-section on the line $yy$ of Fig. 1. Fig. 5 is a plan view of the discharge end of the water-nozzle. Fig. 6 is a plan view of the exterior perforated pipe through which water discharged from the nozzle emerges. Fig. 7 represents a variation of the invention, and Fig. 8 is a separate view of the disk at the base of the shaft in Fig. 7. Fig. 9 is a variation of the form of the nozzle shown in Fig. 3, whereby the packing is obviated. Fig. 10 is another variation in the form of the nozzle, which obviates the use of packing. Fig. 11 is another form of the nozzle in which the packing is obviated and the nozzle held in its place by pressure of water from within. Fig. 12 is another variation in which the nozzle is permanently packed, and a second orifice or series of orifices is provided through which water may enter and pass off when the filter is in operation as a filter, and illustrating, also, a valve for closing said latter orifices and compelling water to pass out through the nozzle when washing the filter-bed.

It is the purpose of my invention to provide in a filter beneath or in the body of its filter-bed a strainer, preferably in the form of a cylinder, which will admit water therein from the filter-bed and lead it off as filtered water from the filter, and upon the interior of said strainer to provide a rotatable pipe or chamber with an elongated nozzle and means for closing the extremities of the sides of the nozzle against the interior shell of the strainer, so that when it is desired to wash the filter by reversing the current through the filter-bed, this current, passing back through this interior cylinder or chamber, is compelled to pass out through the nozzle and the particular orifices in the strainer which are disposed opposite the nozzle, and, being revoluble within the strainer, this nozzle may be brought opposite any series of orifices anywhere about the circumference of the strainer, thereby directing the current of the washing-water into the filter-bed at any desired angle.

Another feature of the invention consists in so constructing the strainer and the said interior pipe or chamber that the interior chamber may be removed at will, or both the interior chamber and the strainer may be removed at any time from the filter.

In carrying out my invention A represents the body of the filter.

B is the filter-bed.

C is the strainer. It may be made in any convenient manner, so as to permit water that is filtered through the filtering-bed to enter through the strainer to the interior without permitting the material of the filter-bed to pass through with it. I prefer that the strainer shall be of that character shown in Fig. 6—that is to say, simply a piece of tubing slitted as there shown at $c$; but instead thereof it might be simply a perforated cylinder or any other suitable form of strainer.

D represents a tube or chamber within the strainer. It is provided with a nozzle or outlet D', which may extend the whole length of the strainer. This nozzle serves the double purpose of permitting filtered water that is passed into the strainer to pass therefrom through the nozzle into the interior of the pipe or chamber D and thence out from the filter for use, and it serves, also, when washing the filter-bed to give direction to the back-flow of washing-water. This interior pipe or chamber D has a stem $d$ projecting to the exterior and is provided with a hand-wheel or any other convenient means for rotating the said chamber or pipe. In this way the nozzle D' may be rotated so as to discharge along any line about the entire circumference of the strainer, and so the current of wash-water may be all directed in any particular direction through the strainer. This enables me to wash thoroughly any particular part of the adjacent bed instead of permitting the wash-water to distribute itself through all of the perforations of the strainer simultaneously. I am thus enabled to concentrate the current in any particular direction, and so by revolving the interior chamber this concentrated current may be brought successively into action against all adjacent portions of the filter-bed.

It is important to confine the stream from the nozzle as much as practicable, so as to prevent it spreading and losing its force within the strainer. To this end I have illustrated several methods of accomplishing the result. Thus in Figs. 1, 2, and 3 the nozzle may be made adjustable, so as to slide in a radial direction toward and from the axis of the pipe or chamber. In this case the nozzle is engaged by arms $D^2$ with eccentrics $D^3$ on a shaft $D^4$. This shaft extends out from the filter and is provided with an arm $D^5$. This arm when brought into a certain fixed position with respect to the hand-wheel $d'$ will have retracted the nozzle free from the strainer. Then by turning the hand-wheel $d'$ the interior chamber may be rotated to bring the nozzle opposite any part of the strainer. Then by again turning the arm $D^5$ the eccentrics are revolved so as to force the nozzle out again into contact with the strainer. Thus this operates to bring the packing-rods of rubber or equivalent $d^2$ into snug contact with the strainer, and so prevents water which passes out through the nozzle from spreading at the sides upon the interior of the strainer, but compels it all to pass through the orifices of the strainer; or, as shown in Fig. 9, the edges at the outer end of the nozzle may be forced directly against the inner surface of the strainer without the intervention of packing; or, as shown in Fig. 10, the edges of the nozzle may be hinged and the eccentrics may operate to force these wings out against the interior surface of the strainer without the intervention of packing; or, as shown in Fig. 11, the nozzle may be made without any connection with the eccentrics and reliance be had upon the pressure of water from within to force the nozzle out against the interior of the strainer when washing the filter-bed.

In all the foregoing appliances when the device is operating as a filter and not in operation washing the bed the nozzle is presumed to be retracted toward the axis of the pipe or chamber D, thus permitting the filtered water which passes through the strainer to enter through and about the said nozzle into the interior chamber D. In Fig. 12, however, I show a variation in which the nozzle has packing-rods of rubber or equivalent $d^2$ at its discharge end, which is maintained constantly in contact with the inner surface of the strainer. In this construction it is manifest that filtered water could only pass into the interior chamber through the particular orifices in the strainer that lie opposite the said nozzle. I would therefore provide one or more orifices $d^3$ in the said interior chamber and arrange a valve $d^4$ to project from the shaft $D^4$, so that by actuating the handle $D^5$ this valve could be turned to cover the said orifices $d^3$ whenever it was desired to wash the filter-bed, and be then actuated to shift the said valve and open the said orifices when the device is operating as a filter, thus permitting the filtered water from all parts of the strainer to enter freely into the interior of the chamber D.

In Figs. 7 and 8 I show another modified form of the apparatus. In this device the strainer is simply a perforated plate supporting the filter-bed, and the rod $d$ supports a rotary nozzle beneath the plate and permits the same to be brought successively beneath any radial section of the strainer.

When this device is operating as a filter, the shaft may be depressed so as to drop the rotary nozzle entirely free from the under side of the strainer, permitting the whole strainer to come into service, while, on the other hand, when it is desired to wash the filter-bed this shaft may be forced out by means of any suitable lever $d^6$, so as to hold the nozzle-plate snugly against the under surface of the strainer.

I am not aware that heretofore any filtering device has been made with a rotatable nozzle, pipe, or chamber within the strainer and provided with means for confining the stream from the inner chamber from spreading beneath or within the strainer, and so compelling the current therefrom to pass wholly through that portion of the strainer opposite the nozzle.

What I therefore broadly claim is—

1. The combination, with a filter, of a strainer, a filtered-water chamber on the inside or delivery side of the said strainer, an adjustable nozzle with means for bringing the same successively opposite the different parts of the strainer, and means for confining and directing the water passing through the nozzle and compelling the same to pass through the portion of the strainer directly opposite the discharge end of the nozzle, substantially as and for the purposes described.

2. The combination, with a filter, of a strainer in the form of a cylinder, and a filtered-water chamber upon the interior of the same, provided with a nozzle, said chamber made rotatable to bring the nozzle adjacent to the different portions of the strainer, substantially as and for the purposes described.

3. The combination, with a filter, of a strainer in the form of a cylinder, and a filtered-water pipe or chamber upon the interior of the same and provided with a nozzle, said chamber made rotatable to bring the nozzle opposite the different parts of the strainer, and the nozzle made adjustable toward and from the strainer, whereby it may at will be separated from or brought into contact with the inner surface of the strainer, substantially as and for the purposes described.

4. The combination, with a filter, of a strainer, a filtered-water chamber or pipe inside the strainer, provided with a nozzle, means for bringing said nozzle opposite the different portions of the strainer, and a shaft provided with eccentrics engaging said nozzle and provided with means outside of the filter for rotating the shaft, whereby the said nozzle may be adjusted radially of said chamber, substantially as described.

In testimony whereof I sign this specification in the presence of two witnesses.

JUNIUS A. BOWDEN.

Witnesses:
MARION A. REEVE,
W. H. CHAMBERLIN.